Figure 1:
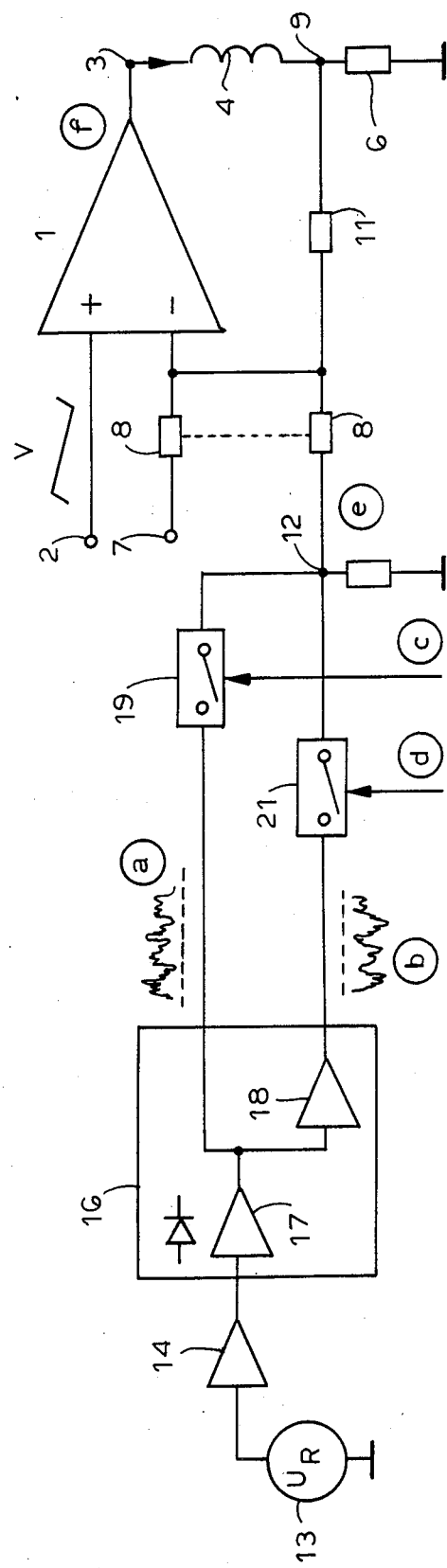

United States Patent [19]

Gehrmann

[11] Patent Number: 4,709,192

[45] Date of Patent: Nov. 24, 1987

[54] PROCESS AND CIRCUIT FOR AVOIDING OF NONLINEARITIES AND BRIGHTENING ON THE PICTURE EDGES IN TELEVISION PICK UP TUBES

[75] Inventor: Rainer Gehrmann, Alsbach-Haehnlein, Fed. Rep. of Germany

[73] Assignee: Robert Bosch GmBH, Stuttgart, Fed. Rep. of Germany

[21] Appl. No.: 819,512

[22] PCT Filed: Jun. 1, 1985

[86] PCT No.: PCT/DE85/00195

§ 371 Date: Dec. 12, 1985

§ 102(e) Date: Dec. 12, 1985

[87] PCT Pub. No.: WO86/00187

PCT Pub. Date: Jan. 3, 1986

[30] Foreign Application Priority Data

Jun. 12, 1984 [DE] Fed. Rep. of Germany ....... 3421684

[51] Int. Cl.⁴ ............................................. H01J 29/56

[52] U.S. Cl. .................................... 315/371; 315/403
[58] Field of Search ........ 315/370, 371, 379, 383–387, 315/389, 403; 358/163, 219, 223, 242

[56] References Cited

U.S. PATENT DOCUMENTS 3,755,707  8/1973  Fremont ............................. 315/386
4,404,499  9/1983  Ryan .................................. 315/371
4,439,713  3/1984  Nakamura et al. ................. 315/370

Primary Examiner—Theodore M. Blum
Assistant Examiner—Gregory C. Issing
Attorney, Agent, or Firm—Michael J. Striker

[57] ABSTRACT

A process for avoiding non-linearities and brightening on the television picture tube includes the generating of an additional signal of a higher frequency than that of the deflections signals, the separating of the additional signal into signal parts of opposite polarity, and the addition of the two additional signal parts to the deflection signals during time intervals immediately before and after the return movement period.

8 Claims, 4 Drawing Figures

PROCESS AND CIRCUIT FOR AVOIDING OF NONLINEARITIES AND BRIGHTENING ON THE PICTURE EDGES IN TELEVISION PICK UP TUBES

STATE OF THE ART

The invention is based on a process and a circuit for avoiding of nonlinearities and brightening the picture edges in television pick up tubes.

During the two dimensional scanning of the signal electrode of a television pick up tube with the assistance of an electronic beam only the active picture area had been discharged heretofore. The area of the signal electrode which surrounds this picture area is also charged due to the incoming light, so that during a nonscanning of this surrounding area a charge remains stationary and rapidly accumulates. This charge can only flow off to the active picture area and therefore causes a picture brightening on the four edges of the active picture area. Moreover, the electronic beam is additionally deflected on these four edges due to the accumulated high charge mountains which accumulate in the surrounding area, so that nonlinearities are caused on the picture edges (so-called edge deflection) which are distortions of the picture in the edge area, in the horizontal as well as the vertical direction. Furthermore, these charge mountains cause substantial flicker effects at the left area of the upper edge zone of the signal electrode, in particular with "$\frac{1}{2}$" pick up tubes.

A process in accordance with the type of the main claim for avoiding these distortions is known from U.S. Pat. No. 4,404,499. Thereby, additional voltages are selectively added for an overscanning to the horizontal and vertical saw tooth deflection signals during the black out intervals, so that the speed of the scanning is increased, for example, doubled or tripled shortly before or shortly after the return movement period. However, it is disadvantageous that the line spacings above the upper and below the lower picture edge are substantially larger than within the active picture area. Thereby, the charges which are present in this surrounding area are only insufficiently discharged, because charges remain stationary between the scanning lines and cause further nonlinearities and picture brightening.

It is therefore an object of the subject invention to provide a process of the aforementioned type with which still present nonlinearities at the proximity of the upper and lower picture edge can be safely avoided.

ADVANTAGES OF THE INVENTION

The process in accordance with the invention with the characterizing features of the main claim is advantageous in that with a relatively low additional expense in timing means all charges above the upper and below the lower picture edge, that is, not only the ones in the area of the predetermined fixed scanning lines of an expanded screen can be neutralized.

Advantageous further embodiments and improvements of the process stated in the main claim is made possible by the measures stated in the subclaims. It is particularly advantageous if the separated positive (or negative) signal amplitudes are invertedly superimposed to the following negative (or positive) amplitudes of the noise signal, whereby a practically complete discharge of the overscanning ranges is made possible.

DRAWING

Figure 2:
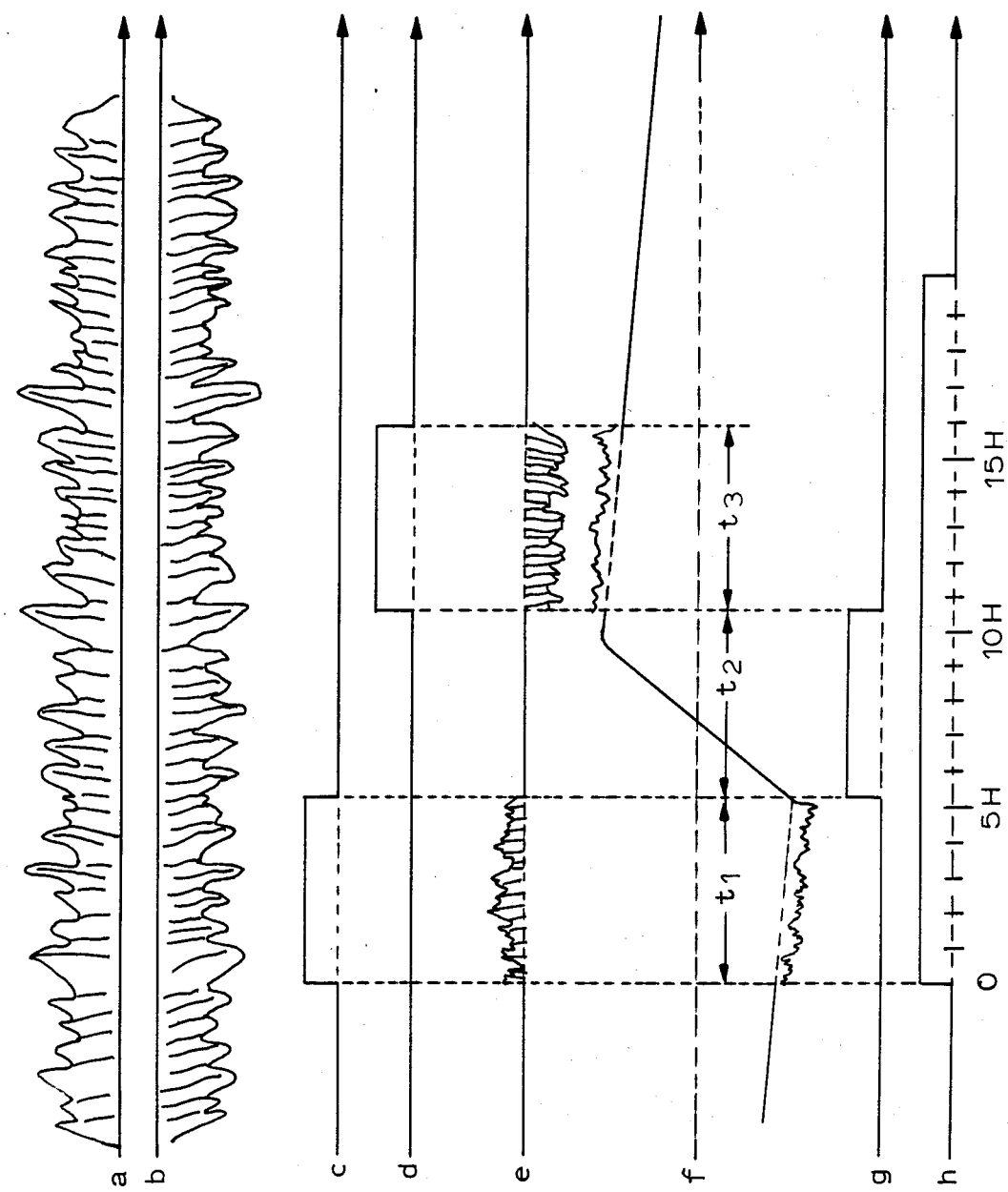
Figure 3:
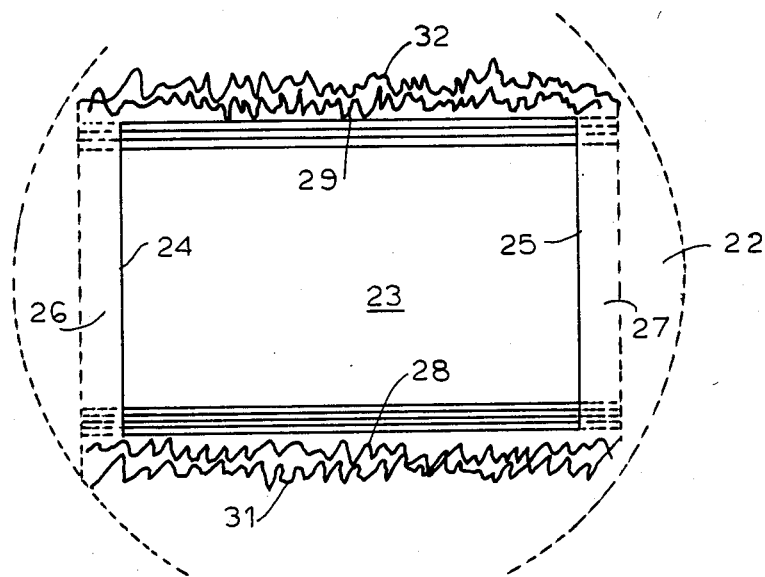
Figure 4:
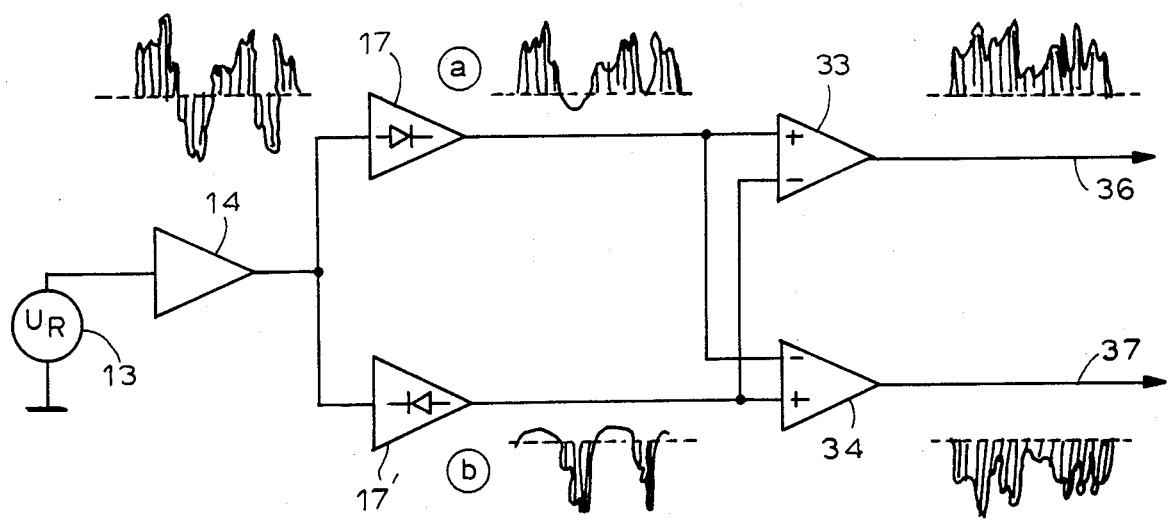

One exemplified embodiment is illustrated in the drawing and is explained in more detail in the following description. The drawing shows:

FIG. 1 a block diagram for performing the process in accordance with the invention, FIG. 2 diagrams of some of the signals which occur in FIG. 1, FIG. 3 the scanning pattern written on the signal electrode, FIG. 4 a block diagram for another mode of generation of the additional signal.

A difference amplifier 1 in the block diagram in accordance with FIG. 1, has its noninverting input connected to terminal 2 for the saw tooth vertical deflection signal. The pair of vertical deflection coils 4 are connected to output 3 and are grounded via a resistor 6. Different correcting signals (for example, parabola like signals) are applied to the inverting input, whereby only one feed line including a terminal 7 and a resistor 8 is shown by way of example. A feed back through a resistor 11 to the inverting input is provided at connection point 9 of the deflection coils 4 and resistor 6 to control the vertical deflection signal.

Furthermore, the additional signal in accordance with the invention is fed to the inverting input of the difference amplifier 1 from the connection point 12 through resistor 8'. A noise signal $U_R$ generated by a noise signal source 13 (for example, a zener diode circuit) is fed through an amplifier 14 to a limiting and inverting circuit 16. The circuit 16 consists of a rectifier stage 17, at the output of which positive amplitudes of the noise signal a in accordance with FIG. 2a are generated. This signal is fed directly to switching stage 19 rectified noise and through an inverter stage 18 to switching stage 21. The inverter 18 generates a b with only negative signal amplitudes, on the other hand, in accordance with FIG. 2b. These switching stages 19 and 21 are operated by timing pulse signals c or d in accordance with FIGS. 2c and 2d, so that the signal a with a plurality of positive amplitudes is transferred to the connection point 12 only during the time interval $t_1$ shortly before the return movement period $t_2$ and the signal b with a plurality of negative amplitudes is applied to the point 12 during the time interval $t_3$ after the return movement period $t_2$.

The separated additional signal e in accordance with FIG. 2e at connection point 12 is fed through the resistor 8' to the inverting input of the difference amplifier 1 and is thereby inversely added to the vertical deflection signal, so that a vertical deflection signal in accordance with FIG. 2f with an additional signal is generated at the output 3. The cathode of the television pick up tube is blacked out with the assistance of pulse signal g in accordance with FIG. 2g during the return movement period $t_2$ of the electronic beam. These additional signal portions are added to the deflection signal within the black out interval h in accordance with FIG. 2h (illustrated by way of example for a signal in accordance with the NTSC-standard).

By adding the separated additional signal portions e to the vertical deflection signal, in accordance with FIG. 2f the signal electrode 22 illustrated in dotted line in FIG. 3, is scanned in the active picture range 23 and beyond the vertical edges 24,25 up to respective strips 26,27 linearly and beyond the horizontal edges 28,29 within respective strips 31,32, the scanning is diffused.

Thus, it is possible to completely remove the charge mountain which is present, in particular in the vertical direction above the upper edge 29 and below the lower edge 28.

A further, improved possibility to generate the additional signal is based on the circuit illustrated in FIG. 4. Thereby, the noise signal $U_R$ which is generated by the noise signal source 13 and amplified in amplifier 14 is fed to two rectifier stages 17,17′, at the outputs of which the noise signal part a with positive signal amplitudes (according to FIG. 2a) and a noise signal part b with negative signal amplitudes (according to FIG. 2b) are generated. The output of the rectifier stage 17 is connected with the noninverting input of difference amplifier 33 and with the inverting input of another amplifier 34. The output of rectifier stage 17′ is connected to non-inverting input of the amplifier 34 and to the inverting input of amplifier 33. By this advantageous measure it is now possible that not only the signals a and b in accordance with FIG. 2a and FIG. 2b may be picked up at the outputs 36 and 37, but also that the negative signal part amplitudes of signal b which had been separated from the noise signal $U_R$, may be inserted into the intermediary spaces of the positive signal amplitudes of signal part a and vice versa. Thereby, additional signal constituents may be picked up at the outputs 36 and 37, whose amplitude curve is without gaps in the given direction and whose separation level is in conformity with the zero line.

While in the above embodiments a noise signal $U_R$ is generated by the noise source 13, other types of signals for example, sine shaped signals which may be generated by a free running oscillator can be used for the generation of the additional signal.

I claim:

1. Process for avoiding non-linearities and brightening on television picture edges by overscanning the active picture range on the signal electrode of a television pick-up tube and adding additional signals to the saw-tooth deflection signals for the horizontal and vertical deflection, comprising the steps of generating an additional signal of higher frequency than that of the deflection signals; separating positive amplitudes of the additional signal from negative amplitudes thereof; invertedly adding to the deflection signals during the blackout interval before the return movement period a plurality of the separated positive amplitudes; and invertedly adding to the deflection signals immediately after the return movement period a plurality of the separated negative amplitudes.

2. Process as defined in claim 1 wherein the additional signal is a noise signal generated by a noise signal generator.

3. Process as defined in claim 1 wherein the separating step includes separating amplitudes of one polarity and generating by inversion of the separated amplitudes, the amplitudes of the opposite polarity.

4. Process as defined in claim 1 wherein the additional signal is a sine signal generated by a free running oscillator.

5. Circuit for avoiding non-linearities and brightening on television picture edges by overscanning the active picture range on the signal electrode of a television pick-up tube and adding to the saw-tooth deflection signals for the horizontal and vertical deflection additional signals during the black-out interval immediately before and after the return movement period, comprising means for generating an additional signal of a higher frequency than that of the deflection signals; means for separating the part of the additional signal having positive amplitudes from the part having negative amplitudes;

timing means for applying respective additional signal parts to a connection point at instants coinciding with the beginning of time intervals before and immediately after the return movement period of the deflection signals; and adding means connected to the connection point to add to the deflection signals the two additional signal parts.

6. Circuit as defined in claim 5 wherein said adding means includes a difference amplifier whose one input is connected to a source of a deflection signal and whose other input is connected to the connection point.

7. Circuit as defined in claim 4, the timing means including two switching stages connected to the connecting point and each being activated by timing pulses, the separating means including a rectifier connected to one switching stage, and an inverter connected between the other switching stage and the rectifier.

8. Circuit as defined in claim 4, wherein the separating means includes two oppositely directed rectifying stages, and two difference amplifiers each having an inverting input and a non-inverting input, an inverting input of one amplifier being connected with the non-inverting input of the other amplifier and to an output of an assigned rectifying stage.

* * * * *